US008088863B2

(12) United States Patent
Ma et al.

(10) Patent No.: US 8,088,863 B2
(45) Date of Patent: Jan. 3, 2012

(54) ORGANIC-SOLVENT DISPERSION OF FINE POLYSILSESQUIOXANE PARTICLE, PROCESS FOR PRODUCING THE SAME, AQUEOUS DISPERSION OF FINE POLYSILSESQUIOXANE PARTICLE, AND PROCESS FOR PRODUCING THE SAME

(75) Inventors: Chenghuan Ma, Wakayama (JP);
Masamichi Yamamoto, Wakayama (JP);
Fumio Oi, Wakayama (JP)

(73) Assignee: Konishi Chemical Ind. Co., Ltd., Wakayama-shi (JP)

( * ) Notice: Subject to any disclaimer, the term of this patent is extended or adjusted under 35 U.S.C. 154(b) by 848 days.

(21) Appl. No.: 11/794,177

(22) PCT Filed: Dec. 27, 2005

(86) PCT No.: PCT/JP2005/023986
§ 371 (c)(1),
(2), (4) Date: Jun. 26, 2007

(87) PCT Pub. No.: WO2006/070846
PCT Pub. Date: Jul. 6, 2006

(65) Prior Publication Data
US 2008/0004359 A1 Jan. 3, 2008

(30) Foreign Application Priority Data

Dec. 27, 2004 (JP) .................... 2004-375600
Aug. 8, 2005 (JP) .................... 2005-229754

(51) Int. Cl.
C08G 77/06 (2006.01)
(52) U.S. Cl. .......... 524/837; 524/745; 528/21; 528/491; 528/493; 528/495; 528/497
(58) Field of Classification Search .................. None
See application file for complete search history.

(56) References Cited

U.S. PATENT DOCUMENTS

| | | | | |
|---|---|---|---|---|
| 3,433,780 A | * | 3/1969 | Cekada, Jr. et al. | 524/156 |
| 4,424,297 A | * | 1/1984 | Bey | 524/714 |
| 5,049,636 A | * | 9/1991 | Wolfgruber et al. | 528/33 |
| 6,071,987 A | * | 6/2000 | Matsumoto et al. | 523/209 |
| 6,132,649 A | * | 10/2000 | Cauda et al. | 264/1.21 |
| 6,251,969 B1 | * | 6/2001 | Worner et al. | 523/201 |

FOREIGN PATENT DOCUMENTS

| | | |
|---|---|---|
| JP | 52-12219 B | 4/1977 |
| JP | 01-217039 A | 8/1989 |
| JP | 04-122731 A | 4/1992 |
| JP | 8-169709 A | 7/1996 |
| JP | 11-43319 A | 2/1999 |
| JP | 2004-91220 A | 3/2004 |

OTHER PUBLICATIONS

Density data for aqueous NaOH solutions at different concentrations from the CLC handbook.*
International Search Report of PCT/JP2005/023986, date of mailing Feb. 14, 2006.

* cited by examiner

Primary Examiner — Marc Zimmer
(74) Attorney, Agent, or Firm — Westerman, Hattori, Daniels & Adrian, LLP

(57) ABSTRACT

An organic-solvent dispersion containing fine polysilsesquioxane particles stably dispersed therein, which is obtained by adjusting the pH of an aqueous dispersion of fine polysilsesquioxane particles to 2 to 9, subsequently adding an organic solvent thereto, and then removing the water from the system; and an aqueous dispersion of fine polysilsesquioxane particles having an appropriate average particle diameter, which is obtained by adjusting the amount of a base catalyst to be used so as to be in a specific range. The process for producing an aqueous dispersion of fine polysilsesquioxane particles having a pH of 2 to 9 with an organic solvent. The process for producing an aqueous dispersion of fine polysilsesquioxane particles having an average particle diameter of 1 to 40 nm comprises mixing a dispersion stabilizer, a base catalyst, and trialkoxysilane in the presence of an aqueous solvent to produce an aqueous dispersion of fine polysilsesquioxane particles, and is characterized in that the base catalyst is used in an amount of 4 to 45 mmol/L per total amount of the aqueous solvent.

10 Claims, No Drawings

ORGANIC-SOLVENT DISPERSION OF FINE POLYSILSESQUIOXANE PARTICLE, PROCESS FOR PRODUCING THE SAME, AQUEOUS DISPERSION OF FINE POLYSILSESQUIOXANE PARTICLE, AND PROCESS FOR PRODUCING THE SAME

TECHNICAL FIELD

The present invention relates to an organic-solvent dispersion of fine polysilsesquioxane particles, a method for producing the same, an aqueous dispersion of fine polysilsesquioxane particles, and a method for producing the same.

BACKGROUND OF THE INVENTION

Polysilsesquioxane has both inorganic and organic structures. The inorganic structure comprises at least one siloxane bond, and imparts the characteristics of an inorganic material, such as excellent transparency, heat resistance, hardness, insulation performance, etc. The organic structure comprises an organic group that is directly bonded to a silicon atom, and supplements the characteristics that are often insufficient in substances having only inorganic structures, such as solubility and dispersion stability in organic materials, adjusting the refractive index and the dielectric constant of polysilsesquioxane, imparting polysilsesquioxane with photo-curable properties, etc. In recent years, polysilsesquioxanes have been attracting public attention as organic/inorganic hybrid materials having the characteristics of both inorganic and organic materials.

The characteristics of polysilsesquioxane as an inorganic material and as an organic material become more notable when the polysilsesquioxane is made into a polymer having a higher molecular weight. However, this lowers its solubility in an organic material and results in difficulties in handling at the time of use. Generally, forming a substance into a polymer having a higher molecular weight and retaining excellent solubility are barely compatible. Therefore, an organic-solvent dispersion of fine polysilsesquioxane particles that attains both characteristics by forming a polysilsesquioxane into macromolecular fine particles and stably dispersing the resultant particles in an organic solvent has been demanded.

In recent years, production of highly transparent organic-solvent dispersions of fine polysilsesquioxane particles having not only both characteristics of inorganic and organic materials and excellent dispersibility in organic materials but also an average particle diameter of, for example, not greater than 40 nm, which is less than the wavelength of visible light has been demanded in fields wherein transparency is required, such as anti-reflection films, transparent adhesives, clear coating materials, optical waveguides, optical electronics materials, and photoprinted circuit board materials.

An aqueous dispersion of fine polysilsesquioxane particles has been conventionally known. For example, Patent Document 1 discloses that a colloidal polysilsesquioxane suspension having a particle size within the range of 10 to 1000 Å can be obtained by adding a trialkoxysilane to an aqueous solution containing a surfactant. However, this colloidal suspension is barely mixable and dispersible in an organic substance because its dispersion medium is water. Therefore, such a suspension is hardly usable if fine polysilsesquioxane particles have to be satisfactorily mixed or reacted with other organic substances. Therefore, in order to make fine polysilsesquioxane particles usable in various fields, production of an organic-solvent dispersion of fine polysilsesquioxane particles wherein an organic solvent is used as a dispersion medium instead of water has been awaited.

An organic-solvent dispersion of fine silica sol particles has also been conventionally known. Such dispersion can be obtained by, for example, concentrating an acidic aqueous silica sol that is prepared using sodium silicate as a starting material, adding isopropanol or like alcohol to obtain a dispersion of silica sol in an organic-solvents mixture, subjecting the dispersion to silylation by adding a silane coupling agent, and replacing its solvent with a methylethyl ketone or like hydrophobic solvent (for example, see Patent Document 2). Such dispersions can also be obtained by subjecting an alkaline aqueous silica sol formed from sodium silicate to deionization using ion exchange resin, concentrating the deionized silica sol by ultrafiltration, and blowing isopropanol steam thereinto while heating (for example, see Patent Document 3).

Patent Document 4 discloses a method for producing a highly pure hydrophilic organic-solvent dispersion of silica sol comprising the following steps (a) to (d).

(a) a first step of hydrolyzing an alkoxysilane in an aqueous alcohol solution;

(b) a second step of concentrating the silica sol solution obtained by hydrolysis;

(c) a third step of adjusting the silica sol solution to coupling by adding a silane coupling agent and adjusting its pH to neutral; and (d) a fourth step of substituting the water in a silica sol solution with a hydrophilic organic solvent.

However, because the above organic-solvent dispersion of silica sol fine particles is obtained by subjecting silica sol to a surface treatment using a silane-coupling agent, the silica sol fine particles thereof mainly comprise siloxane bonds having an inorganic structure (i.e., free from an organic structure). Accordingly, the characteristics of organic- and inorganic-hybrid materials cannot be expected.

Patent Document 1:
Japanese Examined Patent Publication No. S52-12219
Patent Document 2:
Japanese Unexamined Patent Publication No. H11-43319
Patent Document 3:
Japanese Unexamined Patent Publication No. H8-169709
Patent Document 4:
Japanese Unexamined Patent Publication No. 2004-91220

SUMMARY OF THE INVENTION

Problem to be Solved by the Invention

An object of the present invention is to provide a process for producing an organic-solvent dispersion of fine polysilsesquioxane particles, an organic-solvent dispersion obtained by the process, a process for producing an aqueous dispersion of fine polysilsesquioxane particles having an average particle diameter of 1 to 40 nm, and an aqueous dispersion of fine polysilsesquioxane particles produced by the process.

Means for Solving the Problem

The present inventors conducted extensive research in view of the problems of prior-art techniques and found that an organic-solvent dispersion in which fine polysilsesquioxane particles are stably dispersed can be obtained by adjusting the pH of an aqueous dispersion of fine polysilsesquioxane particles to between 2 and 9, adding an organic solvent, and removing water from the system. The present inventors also found that an organic-solvent dispersion of fine polysilsesquioxane particles having a desirable average particle diameter can be obtained by suitably selecting the amount of base catalyst. The present invention has been accomplished based on these findings.

In other words, the present invention provides a production method for an organic-solvent dispersion of fine polysilsesquioxane particles, an organic-solvent dispersion obtained by the method, a production method for an aqueous dispersion of fine polysilsesquioxane particles, and an aqueous dispersion obtained by the method as described below.

Item 1. A method for producing an organic-solvent dispersion of fine polysilsesquioxane particles comprising the step of substituting the water in an aqueous dispersion of fine polysilsesquioxane particles having a pH of 2 to 9 with an organic solvent.

Item 2. A method for producing an organic-solvent dispersion of fine polysilsesquioxane particles according to Item 1, wherein the aqueous dispersion of fine polysilsesquioxane particles having a pH of 2 to 9 is obtained by mixing a dispersion stabilizer, a base catalyst and a trialkoxysilane in the presence of an aqueous solvent, and, if necessary, adjusting the pH of the aqueous dispersion of fine polysilsesquioxane particles to between 2 and 9.

Item 3. A method for producing an organic-solvent dispersion of fine polysilsesquioxane particles according to Item 2, wherein the mixing of a dispersion stabilizer, a base catalyst and a trialkoxysilane in the presence of an aqueous solvent is conducted by adding a trialkoxysilane to an aqueous solvent containing a dispersion stabilizer and a base catalyst.

Item 4. A method for producing an organic-solvent dispersion of fine polysilsesquioxane particles according to Item 2 or 3, wherein the amount of the base catalyst used is 4 to 45 mmol/L per total amount of the aqueous solvent, and the average particle diameter of the fine polysilsesquioxane particles in the aqueous dispersion is 1 to 40 nm.

Item 5. A method for producing an organic-solvent dispersion of fine polysilsesquioxane particles according to Item 4, wherein the average particle diameter of the fine polysilsesquioxane particles in the aqueous dispersion is 5 to 25 nm.

Item 6. A method for producing an organic-solvent dispersion of fine polysilsesquioxane particles according to Item 4 or 5, wherein the amount of the trialkoxysilane used is 1 to 20 weight % of the total weight of the base catalyst and the aqueous solvent.

Item 7. A method for producing an organic-solvent dispersion of fine polysilsesquioxane particles according to any one of Items 4 to 6, wherein the amount of the dispersion stabilizer used is 0.35 to 9 weight % of the total weight of the base catalyst and the aqueous solvent.

Item 8. A method for producing an organic-solvent dispersion of fine polysilsesquioxane particles according to any one of Items 2 to 7, wherein the dispersion stabilizer is an anion-type surfactant.

Item 9. A method for producing an organic-solvent dispersion of fine polysilsesquioxane particles according to Item 8, wherein the anion-type surfactant is at least one member selected from the group consisting of sodium dodecyl sulfate, sodium dodecylbenzene sulphonate, sodium dodecanoate and sodium stearate.

Item 10. A method for producing an organic-solvent dispersion of fine polysilsesquioxane particles according to any one of Items 1 to 9, wherein the organic-solvent substitution is conducted by distillation after or during the addition of an organic solvent to the aqueous dispersion of fine polysilsesquioxane particles.

Item 11. A method for producing an organic-solvent dispersion of fine polysilsesquioxane particles according to any one of Items 1 to 10, which further comprises a step of depositing solid components during the organic-solvent substitution, and removing the solid components by filtration.

Item 12. A method for producing an organic-solvent dispersion of fine polysilsesquioxane particles according to Item 10, wherein an organic layer is obtained by using a water-immiscible organic solvent as an organic solvent for the organic-solvent substitution, and subjecting the organic-solvent dispersion of fine polysilsesquioxane particles obtained by distillation to liquid separation.

Item 13. A method for producing an organic-solvent dispersion of fine polysilsesquioxane particles according to Item 12, wherein the obtained organic layer is subjected to liquid separation and washing, if necessary, and distillation after or during the addition of a water-miscible organic solvent to the organic layer.

Item 14. A method for producing an organic-solvent dispersion of fine polysilsesquioxane particles according to Item 12, wherein the obtained organic layer is subjected to liquid separation and washing step, if necessary, and distillation after or while adding a water-immiscible organic solvent to the organic layer.

Item 15. An organic-solvent dispersion of fine polysilsesquioxane particles obtained by a method of any one of Items 1 to 14.

Item 16. A transparent organic-solvent dispersion of fine polysilsesquioxane particles obtained by a method of any one of Items 1 to 14.

Item 17. A method for producing an aqueous dispersion of fine polysilsesquioxane particles having an average particle diameter of 1 to 40 nm comprising the step of:

mixing a dispersion stabilizer, a base catalyst and a trialkoxysilane in the presence of an aqueous solvent;

the amount of the base catalyst being 4 to 45 mmol/L per total amount of the aqueous solvent.

Item 18. A method for producing an aqueous dispersion of fine polysilsesquioxane particles according to Item 17, wherein the mixing of a dispersion stabilizer, a base catalyst and a trialkoxysilane in the presence of an aqueous solvent is conducted by adding a trialkoxysilane to an aqueous solvent containing a dispersion stabilizer and a base catalyst.

Item 19. A method for producing an aqueous dispersion of fine polysilsesquioxane particles according to Item 17 or 18, wherein the average particle diameter is 5 to 25 nm.

Item 20. A method for producing an aqueous dispersion of fine polysilsesquioxane particles according to any one of Items 17 to 19, wherein the amount of the trialkoxysilanes used is 1 to 20 weight % of the total weight of the base catalyst and the aqueous solvent.

Item 21. A method for producing an aqueous dispersion of fine polysilsesquioxane particles according to any one of Items 17 to 20, wherein the amount of the dispersion stabilizer used is 0.35 to 9 weight % of the total weight of the base catalyst and the aqueous solvent.

Item 22. A method for producing an aqueous dispersion of fine polysilsesquioxane particles according to any one of Items 17 to 21, wherein the dispersion stabilizer is an anion-type surfactant.

Item 23. A method for producing an aqueous dispersion of fine polysilsesquioxane particles according to Item 22, wherein the anion-type surfactant is at least one member selected from the group consisting of sodium dodecyl sulfate, sodium dodecylbenzene sulphonate, sodium dodecanoate and sodium stearate.

Item 24. An aqueous dispersion of fine polysilsesquioxane particles obtained by a method of any one of Items 17 to 23.

The present invention is explained in detail below. In the present specification, "fine polysilsesquioxane particles" may be simply referred to as "fine particles".

One of main features of the method for producing an organic-solvent dispersion of fine polysilsesquioxane particles of the present invention is that the water in the aqueous dispersion of fine polysilsesquioxane particles of pH 2 to 9 is substituted with an organic solvent. The pH of the aqueous dispersion of fine polysilsesquioxane particles subjected to the organic-solvent substitution is generally 2 to 9, and preferably 3 to 8. The aqueous dispersion of fine polysilsesquioxane particles usable in the method of producing the organic-solvent dispersion of fine polysilsesquioxane particles of the present invention is a dispersion in which fine polysilsesquioxane particles are dispersed in an aqueous solvent. The aqueous dispersion of fine polysilsesquioxane particles is produced typically by mixing a dispersion stabilizer, a base catalyst and a trialkoxysilane in the presence of aqueous solvent, preferably by adding or mixing a trialkoxysilane to or with an aqueous solvent containing a dispersion stabilizer and a base catalyst. This process allows fine polysilsesquioxane particles to be formed due to the hydrolysis condensation of trialkoxysilanes, producing a colloidal aqueous dispersion of fine polysilsesquioxane particles. After adjusting the pH of the aqueous dispersion within the above range if necessary, the aqueous dispersion is used in the process for producing an organic-solvent dispersion.

In the production process of the organic-solvent dispersion of the present invention, a still more preferable aqueous dispersion of fine polysilsesquioxane particles is obtained by using 4 to 45 mmol/L of base catalyst per total amount of the aqueous solvent in the method for producing the aqueous dispersion of the present invention, i.e., a method wherein an aqueous dispersion of fine polysilsesquioxane particles is obtained by adding a trialkoxysilane to an aqueous solvent containing a dispersion stabilizer and a base catalyst.

The present invention makes it possible to readily obtain a transparent aqueous dispersion of fine polysilsesquioxane particles having an average particle diameter within the range of 1 to 40 nm, in particular, an aqueous dispersion of fine polysilsesquioxane particles having an average particle diameter within the range of, for example, 5 to 25 nm. The smaller the average particle diameter, the better the transparency of the aqueous dispersion of fine polysilsesquioxane particles will be. When the average particle diameter falls within the range of 1 to 40 nm, a transparent aqueous dispersion of fine polysilsesquioxane particles is obtainable and when the average particle diameter falls within the range of 5 to 25 nm, an extremely transparent aqueous dispersion of fine polysilsesquioxane particles is obtainable.

When the amount of base catalyst used is less than 4 mmol/L, the average particle diameter tends to be not less than 40 nm, and therefore a transparent aqueous dispersion of fine polysilsesquioxane particles is barely obtainable. The more the base catalyst used, the smaller the average particle diameter of fine particles will be. Using this property, an aqueous dispersion having a specific average particle diameter can be obtained by suitably selecting the amount of base catalyst.

The aqueous dispersion of fine polysilsesquioxane particles obtained by the method of the present invention has a structure different from that of an aqueous dispersion of fine polysilsesquioxane particles having an average particle diameter of not more than 40 nm obtained by, for example, as disclosed in Patent Document 1, adding and mixing a trialkoxysilane to an acidic aqueous solvent containing a dispersion stabilizer and an acid catalyst. Specifically, the aqueous dispersion of fine polysilsesquioxane particles of the present invention has a relatively high molecular weight, i.e., contains increased cross-linkages.

A transparent organic-solvent dispersion of fine polysilsesquioxane particles having an average particle diameter of 1 to 40 nm can be obtained by subjecting the aqueous dispersion of fine polysilsesquioxane particles of the present invention to an organic-solvent substitution. The thus-obtained polysilsesquioxane organic-solvent dispersion is highly mixable and has excellent dispersibility with organic substances, and therefore it can be easily well mixed and reacted with other organic substances. Furthermore, because the polysilsesquioxane organic-solvent dispersion of the present invention is transparent, it does not adversely affect the transparency of organic substances nor the color tone of organic substances for which color tone is an important factor. Because of this characteristic, the polysilsesquioxane organic-solvent dispersion of the invention is usable in various fields. Particularly, a transparent organic-solvent dispersion of fine polysilsesquioxane particles having an average particle diameter of 5 to 25 nm is very useful in various fields.

1. Process for Producing an Aqueous Dispersion of Fine Polysilsesquioxane Particles The typical process for producing an aqueous dispersion of fine polysilsesquioxane particles (hereinafter, this process may be simply referred to as an aqueous dispersion production process) is conducted by mixing a dispersion stabilizer, a base catalyst and a trialkoxysilane in the presence of an aqueous solvent, i.e., a mixing method wherein a dispersion stabilizer, a base catalyst and a trialkoxysilane are added or mixed not in any particular order. Preferably, the aqueous-dispersion production process is conducted by adding a trialkoxysilane to an aqueous solvent containing a dispersion stabilizer and a base catalyst and mixing them. This makes the trialkoxysilane hydrolyze and condense, so that fine polysilsesquioxane particles are formed, giving a colloidal aqueous dispersion of fine polysilsesquioxane particles.

In the method of producing an aqueous dispersion of fine polysilsesquioxane particles having an average particle diameter of 1 to 40 nm according to the present invention, the amount of base catalyst used is 4 to 45 mmol/L per total amount of the aqueous solvent when a dispersion stabilizer, a base catalyst and a trialkoxysilane are mixed in the presence of aqueous solvent.

The trialkoxysilanes used in the present process include silicon compounds wherein three alkoxy groups are independently linked directly to a silicon atom and one organic group other than an alkoxy group is linked to the silicon atom, early-stage hydrolyzates thereof, early-stage hydrolysis condensates thereof, etc. During the hydrolysis-condensation process, the alkoxy groups in a trialkoxysilane are hydrolyzed to form hydroxyl groups, and the thus-formed hydroxyl groups are condensed. Therefore, the above-mentioned early-stage hydrolyzates include silicon compounds wherein at least one of the three alkoxy groups in trialkoxysilane is substituted with a hydroxyl group, and early-stage hydrolysis condensates include silicon compound oligomers and polymers formed by condensing the silicon compound and also include those that can form fine polysilsesquioxane particles by being further condensed.

Examples of alkoxy groups in trialkoxysilanes include $C_{1-6}$ alkoxy groups, preferably, methoxy, ethoxy, propoxy, and isopropoxy groups. Among the three alkoxy groups, two or three may be the same or different; however, it is preferable that the three alkoxy groups be the same.

Examples of organic groups in trialkoxysilanes include $C_{2-8}$ alkenyl groups that may have a substituent, $C_{1-8}$ alkyl groups that may have a substituent, $C_{1-8}$ haloalkyl groups that may have a substituent, phenyl groups that may have a substituent, styryl groups that may have a substituent, etc. Examples of usable substituents include halogenophenyl groups, vinyl groups, epoxy groups, methacryloxy groups, acryloxy groups, amino groups, mercapto groups, anilino groups, epoxycycloalkyl groups (for example, epoxycyclohexyl group), etc. Among theses, methyl groups, phenyl groups, and vinyl groups are preferable and methyl groups are particularly preferable.

Specific examples of compounds included in trialkoxysilanes are methyl trimethoxysilane, methyl triethoxysilane, γ-chloropropyl trimetoxysilane, tridecafluoro-1,1,2,2-tetrahydrooctyl triethoxysilane, tridecafluoro-1,1,2,2-tetrahydrooctyl trimethoxysilane, pentafluorophenylpropyl trimethoxysilane, pentafluorophenylpropyl triethoxysilane, phenyl trimethoxysilane, phenyl triethoxysilane, vinyl trimethoxysilane, vinyl triethoxysilane, p-styryl trimethoxysilane, γ-glycidoxypropyl trimetoxysilane, γ-glycidoxypropyl triethoxysilane, β-(3,4-epoxycyclohexyl)ethyl trimethoxysilane, β-(3,4-epoxycyclohexyl)ethyl triethoxysilane, γ-methacryloxypropyl trimethoxysilane, γ-methacryloxypropyl triethoxysilane, γ-acryloxypropyl trimethoxysilane, γ-aminopropyl trimethoxysilane, γ-aminopropyl triethoxysilane, N-phenyl-γ-aminopropyl trimethoxysilane, γ-mercaptopropyl trimethoxysilane, etc. These compounds may be used singly or in combination. Among these, methyl trimethoxysilane, methyl triethoxysilane, phenyl trimethoxysilane, phenyl triethoxysilane, vinyl trimethoxysilane, vinyl triethoxysilane are preferable.

The amount of trialkoxysilanes used in producing an aqueous dispersion that is used in the method for producing an organic-solvent dispersion of the present invention is generally 1 to 100 weight %, and preferably 10 to 50 weight % of the total weight of the base catalyst and the aqueous solvent.

In the method for producing an aqueous dispersion of fine polysilsesquioxane particles having an average particle diameter of 1 to 40 nm of the present invention, the amount of the trialkoxysilanes used is generally 1 to 20 weight %, preferably 3 to 18 weight %, and more preferably 5 to 15 weight % of the total weight of the base catalyst and the aqueous solvent.

It is also possible to use trialkoxysilanes in combination with other alkoxysilanes. Examples of other usable alkoxysilanes include tetra methoxysilane, tetra ethoxysilane and like tetra alkoxysilanes; dimethyl dimethoxysilane, dimethyl diethoxysilane, dimethoxymethyl phenylsilane, diethoxymethyl phenylsilane and like dialkoxysilanes; trimethyl methoxysilane, trimethyl ethoxysilane and like monoalkoxysilanes. The amount of other alkoxysilanes is generally not more than 50 weight %, preferably not more than 20 weight %, and still more preferably not more than 10 weight % of the total weight of the alkoxysilanes including trialkoxysilanes.

Flexibility, hardness, etc., of fine particles can be suitably adjusted by using a trialkoxysilane together with other alkoxysilanes. For example, flexibility tends to be increased by adding dialkoxysilanes and decreased by adding tetra alkoxysilanes. The hardness tends to be increased by adding dialkoxysilanes and decreased by adding tetra alkoxysilanes.

There is no limitation to the aqueous solvents used in the present invention as long as they contain water, but solvents having a water content of generally not less than 50 weight %, preferably not less than 80 weight %, more preferably not less than 90 weight %, and still more preferably not less than 99 weight % are used. Examples of components other than water in the aqueous solvent include methanol, ethanol and like lower alcohols; dioxane, tetrahydrofuran and like ethers; ethyleneglycols; etc. The content thereof is generally not more than 50 weight %, preferably not more than 20 weight %, more preferably not more than 10 weight %, and still more preferably not more than 1% of the total weight of the aqueous solvent. The aqueous solvent may be free from solvents other than water.

Examples of dispersion stabilizers used in producing an aqueous dispersion include cation-type surfactants, anion-type surfactants, nonion-type surfactants, ampholytic surfactants, and high-molecular-weight-type dispersants. Among these, anion-type surfactants are preferable.

Examples of cation-type surfactants include alkyltrimethylammonium chloride, alkylbenzylammonium chloride, dialkyldimethylammonium bromide, etc. Examples of anion-type surfactants include sodium dodecyl sulfate, sodium dodecylbenzene sulfonate, sodium dodecanoate, sodium stearate, etc. Examples of nonion-type surfactants include polyoxyethylene alkylether, polyoxyethylene alkylphenylether, polyoxyethylene alkylester, sorbitan fatty-acid esters, polyoxyethylene sorbitan fatty-acid esters, sucrose fatty-acid esters, etc. Examples of ampholytic surfactants include betaines, alkylimidazolines, etc. Examples of high-molecular-weight-type dispersants include naphthalene sulfonate formaldehyde condensate, polystyrene sulfonate, polyacrylate, salts of copolymers of a vinyl compound and a carboxylic-acid-based monomer, carboxymethylcellulose, polyvinyl alcohol, etc. Among these, sodium dodecyl sulfate, sodium dodecylbenzene sulfonate, sodium dodecanoate, and sodium stearate are preferable.

The amount of dispersion stabilizer used in producing an aqueous dispersion that is used in the method for producing an organic-solvent dispersion of the present invention is generally 0.1 to 100 weight %, and preferably 1 to 50 weight % of the total weight of the trialkoxysilanes. In the method of the present invention for producing an aqueous dispersion of fine polysilsesquioxane particles having an average particle diameter of 1 to 40 nm, the amount of the dispersion stabilizer used is 0.35 to 9 weight %, preferably 0.4 to 7 weight %, and more preferably 0.5 to 5 weight % of the total weight of the base catalyst and aqueous solvent.

The base-catalyst-containing aqueous solvent for use in producing the aqueous dispersion has a pH of generally 8 to 14, preferably 9 to 14, and more preferably 10 to 14. The base-catalyst-containing aqueous solvent for use in producing an aqueous dispersion of fine polysilsesquioxane particles having an average particle diameter of 1 to 40 nm of the present invention has a pH of generally 9 to 13, and preferably 10 to 12. The base-catalyst-containing aqueous solvent used is the above-described aqueous solvent that also contains a base catalyst and a dispersion stabilizer.

Examples of base catalysts usable in the method of the present invention for producing an aqueous dispersion of fine polysilsesquioxane particles having an average particle diameter of 1 to 40 nm include ammonia, alkali hydroxide, alkali carbonate, alkali bicarbonate, organic amines, etc. Since a base catalyst is used to impart alkalinity to an aqueous solvent, use of an aqueous solution of such a base catalyst is preferable. When an aqueous solution or like liquid base catalyst is used, calculation of concentrations is conducted assuming the content of the solvent in the liquid is attributable to the aqueous solvent. A particularly preferable aqueous solution is an aqueous ammonia solution.

In the method of the present invention for producing an aqueous dispersion of fine polysilsesquioxane particles having an average particle diameter of 1 to 40 nm, the amount of base catalyst is selected in such a manner that the concentration of the base catalyst in the total aqueous solvent is generally 4 to 45 mmol/L, preferably 5 to 40 mmol/L, and more preferably 8 to 38 mmol/L. There is no limitation to the order of adding and mixing of a dispersion stabilizer, a base catalyst, and a trialkoxysilane, but it is preferable that a trialkoxysilane be added to an aqueous solvent containing a base catalyst and a dispersion stabilizer.

There is no limitation to the method of adding a trialkoxysilane to an aqueous solvent containing a base catalyst and a dispersion stabilizer. The trialkoxysilane may be added to the aqueous solvent little by little, or the total amount of the trialkoxysilane may be added at a time. Among these, adding the trialkoxysilane little by little is preferable, and the addition may take, for example, over 10 to 300 minutes. The aqueous solution to which a trialkoxysilane is added is preferably subjected to stirring and mixing for homogenization.

When a trialkoxysilane is added to an aqueous solvent containing a base catalyst and a dispersion stabilizer, condensation occurs and fine polysilsesquioxane particles are formed. At this time, the reaction temperature falls within the range of 0 to 100° C., and generally is 15 to 40° C. The reaction time is generally about 0.5 to about 50 hours.

As described above, by mixing a dispersion stabilizer, a base catalyst and a trialkoxysilane in the presence of an aqueous solvent, preferably by adding a trialkoxysilane to an aqueous solvent containing a base catalyst and a dispersion stabilizer, an aqueous dispersion of fine polysilsesquioxane particles is produced.

2. Aqueous Dispersion of Fine Polysilsesquioxane Particles of the Present Invention The aqueous dispersion of fine particles of the present invention comprises fine polysilsesquioxane particles having an average particle diameter of 1 to 40 nm dispersed therein. The aqueous dispersion can be produced, for example, by the above-described production methods. Due to the fact that the fine particles in the aqueous dispersion of the present invention have excellent dispersibility, aggregation of fine particles and increase in the average particle diameter are suppressed even after long-term storage. Therefore, the aqueous dispersion of fine particles of the present invention is useful in fields in which known aqueous dispersions are used. As described in the explanation of the methods for producing the organic-solvent dispersion of the present invention, the aqueous dispersion of the present invention is useful in producing an organic-solvent dispersion of fine particles.

3. Process for Adjusting pH

One aspect of the method for producing the organic-solvent dispersion of the present invention is that the pH of the aqueous dispersion obtained in the above-mentioned aqueous dispersion production process is adjusted generally to between 2 and 9, and preferably between 3 and 8. An aqueous dispersion of fine polysilsesquioxane particles of pH 2 to 9 may be subjected to organic-solvent substitution without adjusting its pH. However, because an organic-solvent dispersion with better dispersibility (in particular, long term dispersion stability) can be obtained when an aqueous dispersion having a pH of neutral to weak acid is used, it is preferable that the pH of the aqueous dispersion be adjusted. In adjusting pH, hydrochloric acid, sulfuric acid and like inorganic acids; formic acid, acetic acid, oxalic acid and like organic acids; etc., can be used.

4. Organic-Solvent Substitution Process

In this process, the water in the aqueous dispersion of fine polysilsesquioxane particles with pH 2 to 9 is substituted with an organic solvent. In other words, after or while adding an organic solvent to an aqueous dispersion, the water in the aqueous dispersion is removed. This allows the fine polysilsesquioxane particles in the water to transfer into the organic solvent, giving an organic-solvent dispersion containing fine particles excellently dispersed therein. The mechanism is assumed as below. In the aqueous dispersion, the fine particles are dispersed in water by being linked with a dispersion stabilizer on the surface thereof. In this process, by adding an organic solvent and removing the water, the dispersion stabilizer linked to the surface of the fine particle is separated and transferred into the water layer, and the fine particles are then transferred and dispersed in the organic layer.

Examples of methods for conducting organic-solvent substitution include a method wherein an organic solvent is added followed by distillation, a method employing liquid separation, a method utilizing membrane treatment, etc.

Examples of organic solvents usable in the organic-solvent substitution process include saturated or unsaturated aliphatic hydrocarbons and halides thereof, aromatic hydrocarbons and halides thereof, alcohol compounds, phenol compounds, ether compounds, acetal compounds, ester compounds, nitrogen-containing compounds, sulfur-containing compounds, ketone compounds, carboxylic acid compounds, etc. These compounds may be used singly or in combination. The organic solvent can be suitably selected depending on the application of the resultant organic-solvent dispersion.

Preferable examples of saturated or unsaturated aliphatic hydrocarbons and halides thereof are those having 1 to 8 carbons, such as hexane, heptane, cyclohexane, chloroform, and dichloromethane, etc.

Examples of aromatic hydrocarbons and halides thereof include benzene, toluene, xylene, monochlorobenzene, dichlorobenzene, etc.

Examples of alcohol compounds include methanol, ethanol, isopropanol, tert-butyl alcohol, n-butanol, cyclohexanol, benzyl alcohol, ethyleneglycol, propyleneglycol, glycerin, 2-methoxyethanol, 2-ethoxyethanol, 2-isopropoxy ethanol, 2-butoxyethanol, etc.

Examples of phenol compounds include phenol, cresol, etc.

Examples of ether compounds include dioxane, anisole, ethyleneglycol dimethylether, ethyleneglycol diethylether, propyleneglycol monomethylether, propyleneglycol dimethylether, diethyleneglycol dimethylether, diethyleneglycol diethylether, tetrahydrofuran, etc.

Examples of acetal compounds include methylal, acetal, etc.

Examples of ester compounds include ethyleneglycol monomethylether acetate, ethyleneglycol monoethylether acetate, propyleneglycol monomethylether acetate, methylacetate, ethylacetate, propylacetate, butylacetate, etc Examples of nitrogen-containing compounds include N,N-dimethylformamide and like amines, acetonitrile, etc.

Examples of sulfur-containing compounds include dimethylsulfoxide, sulfolane, sulfolene, etc.

Examples of ketone compounds include acetone, methylethyl ketone, methylisobutyl ketone, etc.

Examples of carboxylic acid compounds include acetic acid, propionic acid, butyric acid, etc.

With respect to an organic solvent having immiscibility with water, separation between an organic layer and a water layer becomes possible by means of liquid separation after adding a water-immiscible organic solvent. Note that the term "water-immiscible organic solvent" means a solvent that is immiscible with water to such an extent that the solvent can be separated from water even when it is added to water. Such water-immiscible organic solvents include organic solvents that are not miscible with water at all, and solvents that are miscible with water to some extent but can still be separated from water. In contrast, water-miscible organic solvents are organic solvents that cannot be separated from water by any ordinary liquid separation processes when mixed with water.

Examples of preferable water-miscible organic solvents include methanol, ethanol, isopropanol, tert-butyl alcohol, ethyleneglycol, propyleneglycol, glycerin, 2-methoxyethanol, 2-ethoxyethanol, 2-isopropoxyethanol, 2-butoxyethanol, dioxane, ethyleneglycol dimethylether, ethyleneglycol diethylether, propyleneglycol monomethylether, propyleneglycol dimethylether, diethyleneglycol dimethylether, diethyleneglycol diethylether, tetrahydrofuran, methylal, ethyleneglycol monomethylether acetate, propyleneglycol monomethylether acetate, methylacetate, ethyleneglycol monoethylether acetate, N,N-dimethylformamide, acetonitrile, dimethylsulfoxide, sulfolane, acetone, acetic acid, propionic acid, butyric acid, etc.

Preferable examples of water-immiscible organic solvents include benzene, toluene, xylene, monochlorobenzene, dichlorobenzene, n-butanol, cyclohexanol, benzyl alcohol, phenol, cresol, anisole, acetal, ethylacetate, propylacetate, butylacetate, methylethyl ketone, methylisobutyl ketone, hexane, heptane, cyclohexane, chloroform, dichloromethane, etc.

In the method wherein addition of an organic solvent and distillation are conducted, by adding an organic solvent to an aqueous dispersion having a pH of 2 to 9 and conducting distillation, the water in the aqueous dispersion is removed from the system and the fine particles are dispersed in the organic solvent. A method wherein distillation is conducted while adding an organic solvent dropwise to an aqueous dispersion is particularly preferable, since excellent dispersibility of fine particles can be obtained.

The weight of the organic solvent added is generally 0.5 to 100 times, preferably 1 to 50 times that of the water in the aqueous dispersion. The distillation temperature is generally 0 to 200° C., and preferably 10 to 100° C. There is no limitation to the distillation time as long as the weight of the water in the aqueous dispersion is reduced to not exceeding a predetermined amount. Here, the predetermined amount is determined based on the water content allowable depending on the application of the resultant organic-solvent dispersion of fine polysilsesquioxane particles. It is preferable that the distillation be conducted under reduced pressure.

In the method employing liquid separation, a water-immiscible organic solvent is used as an organic solvent. In this method, a water-immiscible organic solvent is added to a pH 2 to 9 aqueous dispersion so as to extract the fine particles in the aqueous dispersion, and the resultant mixture is then allowed to stand still, so that the fine polysilsesquioxane particles in the aqueous dispersion are transferred into the organic layer. In this case, the dispersion stabilizer remains in the water layer. Subsequently, the organic layer is separated so as to obtain an organic-solvent dispersion of fine polysilsesquioxane particles.

The weight of the organic solvent added is generally 0.5 to 10 times, and preferably 1 to 5 times of the weight of the water in the aqueous dispersion. There is no limitation to the extraction time as long as the fine particles in the water layer can be extracted into the organic layer. Transfer of the fine particles into the organic layer can be confirmed by evaluating the solids contents. If the particle diameter of the fine particle is so large that the dispersion is not transparent, the extraction of the fine particles can also be confirmed by visual observation. When the fine particles are completely transferred into the organic layer, the water layer changes from an emulsion status with some transparency in which fine particles are dispersed to transparent, and the organic layer changes from transparent to an emulsion status with some transparency in which fine particles are dispersed. By completely transferring fine particles from the water layer into the organic layer, the solids content decreases in the water layer and the solids content increases in the organic layer in an amount equivalent to the fine polymethylsilsesquioxane particles content of the aqueous dispersion.

It is particularly preferable that the method employing liquid separation be conducted in combination with a method conducting distillation during or after adding an organic solvent or a method employing a membrane treatment. For example, an organic layer is formed by subjecting a dispersion obtained by distillation to liquid separation, and this causes the dispersion stabilizer contained in the dispersion to transfer into the water layer, resulting in production of an organic-solvent dispersion of fine particles having a reduced content of dispersion stabilizer. In this case, the weight of the organic solvent added is generally 0.5 to 50 times, preferably 1 to 10 times that of the water in the aqueous dispersion. There is no limitation to the extraction time as long as the fine particles in the water layer can be transferred into the organic layer.

By conducting liquid separation once or more in the manner as described above, the content of dispersion stabilizer in an organic-solvent dispersion of fine particles can be reduced to thereby improve the degree of refinement.

It is also possible to obtain a water-miscible organic-solvent dispersion by conducting distillation and addition of a water-miscible organic solvent to a dispersion obtained by conducting distillation or liquid separation using a water-immiscible organic solvent. Likewise, a water-immiscible organic-solvent dispersion can be obtained by conducting distillation during or after adding a water-immiscible organic solvent to a dispersion obtained by conducting distillation or liquid separation using a water-immiscible organic solvent. In these cases, the weight of the organic solvent added is generally 0.1 to 50 times, preferably 0.2 to 10 times that of the water-immiscible organic solvent in the organic-solvent dispersion. The distillation temperature is generally 0 to 200° C., and preferably 10 to 100° C. There is no limitation on the distillation time in production of a water-miscible organic-solvent dispersion as long as the contents of water and the water-immiscible organic solvent can be reduced to not exceeding predetermined amounts. Likewise, in production of the water-immiscible organic solvent dispersion, there is no limitation to the distillation time as long as the water content can be made not exceeding a predetermined amount. Here, the predetermined amounts are determined based on the allowable contents of water and water-immiscible organic solvent depending on the application of the resultant organic-solvent dispersion of fine polysilsesquioxane particles. It is preferable that the distillation be conducted under reduced pressure.

In the method employing a membrane treatment, an organic solvent is added to an aqueous dispersion having a pH of 2 to 9, followed by removing the water in the aqueous dispersion from the system using the membrane treatment, so that the fine particles are made to disperse in the organic solvent. Examples of methods for conducting the membrane treatment include those using a microfiltration membrane, ultrafiltration membrane, a nano-filtration membrane, a reverse osmotic membrane, etc. Among these, the membrane treatment methods using an ultrafiltration membrane are particularly preferable. Examples of the membrane materials used in such membrane treatment methods include cellulose, cellulose diacetate, cellulose triacetate, polyamide, polysulfone, polystyrene, polyimide, polyacrylonitrile, fluoro resin, ceramics, etc. Among these, polyimide, fluoro resin, ceramics and the like that are resistant to organic solvents are preferable. Polyimide-based membranes are available from Nitto Denko Corporation. Fluoro resin membranes are available form Rohne-Poulenc, Millipore Corporation, etc. Ceramic membranes are available from Sumitomo Electric Industries, Ltd., etc.

The weight of the organic solvent added in the method using the membrane treatment is generally 0.5 to 50 times, and preferably 1 to 10 times that of the water in the aqueous dispersion. There is no limitation to the time for conducting the membrane treatment as long as the water content is reduced to not exceeding a predetermined amount. Here, the predetermined amount is the water content allowable depending on the application of the resulting organic-solvent dispersion of fine polysilsesquioxane particles.

5. Organic-Solvent Dispersion of Fine Polysilsesquioxane Particles of the Present Invention The organic-solvent dispersion of fine particles of the present invention comprises fine polysilsesquioxane particles dispersed in an organic solvent, which can be obtained by, for example, the production methods described above. The number-average molecular weight measured by gel-permeation chromatography is, for example, about 80,000 in an organic-solvent dispersion of fine particles having an average particle diameter of 20 nm, and about 120,000 in an organic-solvent dispersion of fine particles having an average particle diameter of 40 nm. Due to the fact that the fine particles contained in the organic-solvent dispersion of the present invention have a satisfactorily high molecular weight, they exhibit characteristics of both inorganic and organic materials. Due to the dispersed particles having excellent dispersibility, coagulation and increase in average particle diameter are suppressed even after long-term storage. Therefore, the organic-solvent dispersion of fine polysilsesquioxane particles of the present invention enables fine polysilsesquioxane particles to be used not only in the fields wherein known aqueous dispersions have been conventionally used and organic solvents are usable, but also in fields wherein use of fine polysilsesquioxane particles was restricted since no organic-solvent dispersion had been developed. Specifically, the organic-solvent dispersion of fine polysilsesquioxane particles of the present invention can be suitably used in materials for, for example, adhesives, electrical insulators, paints, coating compositions, optical materials, modifiers for resin and various films, abrasives for organic surfaces, etc.

It is preferable that the organic-solvent dispersion of fine particles of the present invention have a degree of dispersion (weight-average molecular weight/number-average molecular weight), as measured by the gel-permeation chromatography, generally within the range of 1.0 to 2.0, and preferably within the range of 1.1 to 1.5. Having a degree of dispersion within the above range results in an organic-solvent dispersion of fine particles having a monodisperse molecular weight distribution. It is further preferable that the organic-solvent dispersion of fine particles of the present invention have a viscosity (at a solids content of 20% and a temperature of 25° C.) within the range of generally 1 to 20 mPa·s, and preferably 2 to 10 mPa·s. If the viscosity thereof falls within such a range, an organic-solvent dispersion of fine particles having a low viscosity can be obtained. Such organic-solvent dispersion of fine particles exhibits particularly preferable characteristics, such as excellent dispersibility in thermoplastic materials, photo-curable materials, thermosetting materials and like organic materials, homogeneity of coated films, excellent sliding properties, hardness, abrasion resistance, wear resistance, low coefficient of linear thermal expansion, alkali resistance, oil resistance, etc.

The average particle diameter of the fine particles in the organic-solvent dispersion of the present invention is generally 1 to 1000 nm. Particularly, an organic-solvent dispersion of fine polysilsesquioxane particles obtained by the method of the present invention having an average particle diameter within the range of 1 to 40 nm, especially 5 to 25 nm is highly transparent because its average particle diameter is smaller than the wavelength of visible light. Accordingly, it is expected that its utility value will be further increased. Specifically, such dispersions can be suitably used in fields wherein improvement of hardness, abrasion resistance, wear resistance and like mechanical characteristics; heat resistance; alkali resistance, oil resistance and like chemical resistance; and adjustment of refractive index are required while maintaining the transparency of an organic material. Specifically, such dispersion can be suitably used in materials for anti-reflection coatings, transparent adhesives, transparent coating materials, optical waveguides, optoelectronics, photoprinted circuit boards, etc.

Furthermore, the organic-solvent dispersion of fine particles of the present invention has better alkali- and oil-resistance and characteristics, of which refractive index is easily adjusted compared to silica sol that has an inorganic structure. The organic-solvent dispersion of fine particles of the present invention has various distinguished characteristics, such as excellent dispersibility in photocurable, thermosetting or thermoplastic organic materials, obtaining coated films having fine particles uniformly dispersed therein, improving the sliding properties of organic materials, reducing coefficient of thermal expansion, etc.

The organic-solvent dispersion of fine particles of the present invention may contain water and/or a dispersion stabilizer in an amount allowable according to its application. If the water and/or dispersion stabilizer content exceeds the allowable range, a desired organic-solvent dispersion of fine particles can be obtained by suitably combining the above-mentioned membrane treatment, liquid separation, and distillation. The water content in the organic-solvent dispersion of fine particles of the present invention is generally 0.01 to 10 weight %, and preferably 0.1 to 5 weight %. The content of the dispersion stabilizer in the organic-solvent dispersion of fine particles of the present invention is generally 0.01 ppm to 100000 ppm, and preferably 1 to 50000 ppm. Note that the contents of water and dispersion stabilizer in the organic-solvent dispersion of fine particles obtained by the method of the present invention can be readily adjusted by adding an organic solvent to the dispersion.

Effect of the Invention

The method of producing the organic-solvent dispersion of the present invention provides an organic-solvent dispersion that comprises well-dispersed fine polysilsesquioxane particles and exhibits long-term stability. The organic-solvent dispersion of fine polysilsesquioxane particles of the present invention allows fine polysilsesquioxane particles to be used in fields wherein the use of fine polysilsesquioxane particles was restricted because no organic-solvent dispersions have been previously developed.

The aqueous dispersion of polysilsesquioxane of the present invention makes it possible to produce a transparent aqueous dispersion of fine polysilsesquioxane particles. The organic-solvent dispersion of fine polysilsesquioxane particles of the present invention obtained using the aqueous dispersion of polysilsesquioxane of the present invention is highly transparent. This enables fine polysilsesquioxane particles to be used in fields wherein use of fine polysilsesquioxane particles was restricted since no organic-solvent dispersion existed.

BEST MODE FOR CARRYING OUT THE INVENTION

Examples are given below to illustrate the invention in more detail. However, the invention is not limited to the Examples.

EXAMPLES

The particle diameter of fine particles was measured by a dynamic-light-scattering method. The water content was measured using a Karl Fischer moisture meter, and the dispersion stabilizer content was measured using an atomic absorption spectrometer. The solids content was evaluated based on the decrease in the weight at 110° C., and the presence of aggregation was confirmed by visual observation. The transparency of the dispersion was evaluated based on the transmittance at 400 nm measured using UV/Vis spectra. Measurement conditions were as below.

The fine particle content in the dispersion was 5 weight %, and the cell length was 1 cm. A dispersion having a transmittance at 400 nm of not less than 90% was evaluated as very transparent, that of not less than 70% was evaluated as transparent, and that of less than 70% was evaluated as translucent.

Example 1

Propyleneglycol Monomethylether Dispersion

To 800 g of distilled water were added 28% ammonia solution in such a manner that its pH became 10.4 and 2.5 g of sodium dodecyl sulfate. To the thus-obtained mixed solution was added 200 g of methyltrimethoxysilane dropwise at 25° C. over 135 minutes, the mixture was then agitated at the same temperature for 16 hours, giving 1000 g of aqueous dispersion of fine polymethylsilsesquioxane particles. The pH of the resultant aqueous dispersion (300 g) was adjusted to 7 by adding 1 N aqueous sulfuric acid solution. Subsequently, distillation under reduced pressure was conducted until the water content was reduced to not more than 5% while adding 2000 g of propyleneglycol monomethylether dropwise, giving 150 g of propyleneglycol monomethylether dispersion of fine polymethylsilsesquioxane particles.

Example 2

Methylethyl Ketone Dispersion

To 800 g of distilled water were added 28% ammonia solution in such a manner that its pH became 10.4 and 2.5 g of sodium dodecyl sulfate. To the thus-obtained mixed solution was added 200 g of methyltrimethoxysilane dropwise at 25° C. over 135 minutes, the mixture was then agitated at the same temperature for 16 hours, giving 1000 g of aqueous dispersion of fine polymethylsilsesquioxane particles. The pH of the resultant aqueous dispersion (300 g) was adjusted to 7 by adding 1 N aqueous sulfuric acid solution. Subsequently, distillation under reduced pressure was conducted until the water content was reduced to not more than 5% while adding 2000 g of methylethyl ketone dropwise, depositing insoluble components of the dispersion stabilizer. By filtering off the deposited dispersion stabilizer, 150 g of a methylethyl ketone dispersion of fine polymethylsilsesquioxane particles was obtained.

Example 3

Methylethyl Ketone Dispersion

To 100 g of a methylethyl ketone dispersion of fine polymethylsilsesquioxane particles prepared in Example 2 was added 50 g of water. The dispersion stabilizer contained in the organic layer was extracted and transferred into the water layer by agitation. The dispersion was allowed to stand still, and the organic layer was then separated out. Such liquid separation and washing operation was repeated 3 times to thereby reduce the dispersion stabilizer content in the organic layer. Subsequently, distillation under reduced pressure was conducted until the water content was reduced to not more than 5% while adding 70 g of methylethyl ketone to the organic layer, giving 100 g of methylethyl ketone dispersion of fine polymethylsilsesquioxane particles.

Example 4

Methylethyl Ketone Dispersion

To 300 g of an aqueous dispersion of fine polymethylsilsesquioxane particles obtained in the same manner as in Example 2 was added 1 N aqueous sulfuric acid solution so as to adjust its pH to 7. Subsequently, while adding 1000 g of methylethyl ketone dropwise, distillation under reduced pressure was conducted until the fine particles in the water transferred into the organic solvent. The transfer of the fine particles to the organic solvent was confirmed by visual observation to ensure that the cloudy transparent water layer became transparent with little cloudiness and the transparent organic layer became cloudily transparent with fine particles dispersed therein. The insoluble components of the dispersion stabilizer did not deposit. After allowing the thus-obtained dispersion to stand still, the separated water layer was removed. Water was added to the organic layer and the liquid separation and washing operation as in Example 3 was repeated 3 times to transfer the dispersion stabilizer in the organic layer into the water layer. While adding methylethyl ketone dropwise to the organic layer obtained by the liquid separation, distillation under reduced pressure was conducted until the water content was reduced to not more than 5%, giving 150 g of a methylethyl ketone dispersion of fine polymethylsilsesquioxane particles.

Example 5

Propyleneglycol Monomethylether Dispersion

To 400 g of an aqueous dispersion of fine polymethylsilsesquioxane particles obtained in the same manner as in Example 2 was added 1 N aqueous sulfuric acid solution so as to adjust its pH to 7. Subsequently, while adding 1300 g of methylethyl ketone dropwise, distillation under reduced pressure was conducted until the fine particles transferred from the water into the organic solvent. The insoluble components of dispersion stabilizer did not deposit. After allowing the thus-obtained dispersion to stand still, the separated water layer was removed. Water was added to the organic layer and the liquid separation and washing operation as in Example 3 was repeated 3 times to extract the dispersion stabilizer in the organic layer and transferred it into the water layer. While adding propyleneglycol monomethylether dropwise to the organic layer obtained by liquid separation, distillation under reduced pressure was conducted until the temperature of distillate reached the boiling point of propyleneglycol monomethylether, giving 200 g of propyleneglycol monomethylether dispersion of fine polymethylsilsesquioxane particles.

Example 6

Methylethyl Ketone Dispersion of Fine Polyphenylsilsesquioxane Particles

A methylethyl ketone dispersion of fine polyphenylsilsesquioxane particles (200 g) was obtained in the same manner as in Example 4 except that phenyltrimethoxysilane was used instead of methyltrimethoxysilane.

Example 7

Methylethyl Ketone Dispersion of Polyvinylsilsesquioxane Fine Particles

A methylethyl ketone dispersion of polyvinylsilsesquioxane fine particles (160 g) was obtained in the same manner as in Example 4 except that vinyltrimethoxysilane was used instead of methyltrimethoxysilane.

Example 8

Methylethyl Ketone Dispersion of Fine Polymethylsilsesquioxane Particles

A methylethyl ketone dispersion of fine polymethylsilsesquioxane particles (120 g) was obtained in the same manner as in Example 4 except that methyltriethoxysilane was used instead of methyltrimethoxysilane.

Comparative Example 1

Organic-Solvent Substitution of pH 10.4 Aqueous Dispersion of Fine Particles An aqueous dispersion of fine polymethylsilsesquioxane particles (pH 10.4, 300 g) obtained in the same manner as in Example 2 was subjected to distillation under reduced pressure without adjusting its pH while adding 1000 g of methylethyl ketone dropwise. Due to the mixture solidifying into gel, a methylethyl ketone dispersion of fine polymethylsilsesquioxane particles was not obtained.

Test Example 1

The organic-solvent dispersions of fine polysilsesquioxane particles and the organic-solvent dispersions of fine polymethylsilsesquioxane particles obtained in Examples 1 to 8 and Comparative Example 1 were examined to evaluate their average particle diameters, water contents, dispersion stabilizer contents, solids contents, and presence of coagulation. Tables 1 and 2 show the results. The diameter of the fine particles was measured by a dynamic-light-scattering method immediately after production and after being allowed to stand still for 3 months. The water content was measured using a Karl Fischer moisture meter, and dispersion stabilizer content was measured using an atomic absorption spectrometer. Solids content was evaluated by measuring the decrease in the weight at 110° C., and presence of aggregation was confirmed by visual observation immediately after and three months after production.

TABLE 1

|  | Example 1 | Example 2 | Example 3 | Example 4 | Example 5 |
|---|---|---|---|---|---|
| Particle diameter (nm) Immediately after production | 56.7 | 60.6 | 60.4 | 60.0 | 53.7 |
| Particle diameter (nm) Three months after production | 56.8 | 60.7 | 60.6 | 60.2 | 53.7 |
| Water content (%) | 0.7 | 0.7 | 0.7 | 0.7 | 1.1 |
| Dispersion stabilizer content (ppm) | 63.0 | 57.0 | 46.0 | 35.0 | 34.7 |
| Solids content (%) | 20.4 | 20.3 | 20.7 | 20.5 | 21.4 |
| Coagulation sedimentation Immediately after production | Not present | Not present | Not present | Not present | Not present |
| Coagulation sedimentation Three months after production | Not present | Not present | Not present | Not present | Not present |

TABLE 2

| | Example 6 | Example 7 | Example 8 | Comparative Example 1 |
|---|---|---|---|---|
| Particle diameter (nm) Immediately after production | 15.0 | 14.0 | 58.9 | Gelated |
| Particle diameter (nm) Three months after production | 15.2 | 14.1 | 59.0 | — |
| Water content (%) | 0.7 | 0.7 | 0.7 | — |
| Dispersion stabilizer content (ppm) | 38.0 | 36.5 | 34.8 | — |
| Solids content (%) | 20.4 | 20.8 | 21.2 | — |
| Coagulation sedimentation Immediately after production | Not present | Not present | Not present | Gelated |
| Coagulation sedimentation Three months after production | Not present | Not present | Not present | — |

Example 9

Aqueous Dispersion

To 895.5 g of distilled water were added 4.5 g of 1N ammonia solution and 13.5 g of sodium dodecyl sulfate (SDS). To the thus-obtained mixed solution, 100.0 g of methyltrimethoxysilane (M-TMS) was added at 25° C. over 135 minutes, and the mixture was then agitated at the same temperature for 16 hours, giving 1013 g of a transparent aqueous dispersion of fine polymethylsilsesquioxane particles. The proportion of the amount of M-TMS used (100.0 g) to that of the mixed solution excluding SDS (900 g) was 11.1 weight %. The proportion of the amount of SDS used (13.5 g) to that of the mixed solution excluding SDS (900 g) was 1.50 weight %. The ammonia content in the mixed solution excluding SDS (900 g) was 5.0 mmol/L. Table 3 shows the concentrations of these components, and average particle diameters of the fine particles in aqueous dispersion.

Example 10

Aqueous Dispersion

To 888.9 g of distilled water were added 7.8 g of 1N ammonia solution and 13.5 g of sodium dodecyl sulfate. To the thus-obtained mixed solution, 99.6 g of methyltrimethoxysilane was added at 25° C. over 135 minutes, and the mixture was then agitated at the same temperature for 16 hours, giving 1010 g of an extremely transparent aqueous dispersion of fine polymethylsilsesquioxane particles. Table 3 shows the concentration of each component, and average particle diameters of the fine particles in aqueous dispersion.

Example 11

Aqueous dispersion

To 888.9 g of distilled water were added 11.1 g of 1 N ammonia solution and 13.5 g of sodium dodecyl sulfate. To the thus-obtained mixed solution, 100 g of methyltrimethoxysilane was added at 25° C. over 135 minutes, and the mixture was then agitated at the same temperature for 16 hours, giving 1014 g of an extremely transparent aqueous dispersion of fine polymethylsilsesquioxane particles. Table 3 shows the concentration of each component, and average particle diameters of the fine particles in aqueous dispersion.

Example 12

Aqueous Dispersion

To 888.9 g of distilled water were added 22.6 g of 1 N ammonia solution and 13.7 g of sodium dodecyl sulfate. To the thus-obtained mixed solution, 101.3 g of methyltrimethoxysilane was added at 25° C. over 135 minutes, and the mixture was then agitated at the same temperature for 16 hours, giving 1026 g of an extremely transparent aqueous dispersion of fine polymethylsilsesquioxane particles. Table 3 shows the concentrations of these components, and average particle diameters of the fine particles in aqueous dispersion.

Example 13

Aqueous Dispersion

To 866.2 g of distilled water were added 33.8 g of 1 N ammonia solution and 13.5 g of sodium dodecyl sulfate. To the thus-obtained mixed solution, 101.3 g of methyltrimethoxysilane was added at 25° C. over 135 minutes, and the mixture was then agitated at the same temperature for 16 hours, giving 1013 g of an extremely transparent aqueous dispersion of fine polymethylsilsesquioxane particles. Table 3 shows the concentrations of these components, and average particle diameters of the fine particles in aqueous dispersion.

Example 14

Aqueous Dispersion

To 888.9 g of distilled water were added 11.1 g of 1 N ammonia solution and 6.8 g of sodium dodecyl sulfate. To the thus-obtained mixed solution, 100 g of methyltrimethoxysilane was added at 25° C. over 135 minutes, and the mixture was then agitated at the same temperature for 16 hours, giving 1006 g of a transparent aqueous dispersion of fine polymethylsilsesquioxane particles. Table 3 shows the concentrations of each component, and average particle diameters of the fine particles in aqueous dispersion.

Example 15

Aqueous Dispersion

To 888.9 g of distilled water were added 11.1 g of 1 N ammonia solution and 27.0 g of sodium dodecyl sulfate. To the thus-obtained mixed solution, 100 g of methyltrimethoxysilane was added at 25° C. over 135 minutes, and the mixture was then agitated at the same temperature for 16 hours, giving 1027 g of a transparent aqueous dispersion of fine polymethylsilsesquioxane particles. Table 3 shows the concentrations of each component, and average particle diameters of the fine particles in aqueous dispersions.

Example 16

Aqueous Dispersion

To 888.9 g of distilled water were added 11.1 g of 1 N ammonia solution and 45.0 g of sodium dodecyl sulfate. To the thus-obtained mixed solution, 100 g of methyltrimethoxysilane was added at 25° C. over 135 minutes, and the mixture was then agitated at the same temperature for 16 hours, giving 1045 g of a transparent aqueous dispersion of fine polymethylsilsesquioxane particles. Table 3 shows the concentrations of each component, and average particle diameters of the fine particles in aqueous dispersion.

Example 17

Aqueous Dispersion

To 839.5 g of distilled water were added 10.5 g of 1 N ammonia solution and 12.8 g of sodium dodecyl sulfate. To the thus-obtained mixed solution, 150 g of methyltrimethoxysilane was added at 25° C. over 135 minutes, and the mixture was then agitated at the same temperature for 16 hours, giving 1012 g of transparent aqueous dispersion of fine polymethylsilsesquioxane particles. Table 3 shows the concentrations of each component, and average particle diameters of the fine particles in aqueous dispersion.

TABLE 3

| | Aqueous dispersion | | | | | | | | |
|---|---|---|---|---|---|---|---|---|---|
| | Examples | | | | | | | | |
| | 9 | 10 | 11 | 12 | 13 | 14 | 15 | 16 | 17 |
| M-TMS (weight %) | 11.1 | 11.1 | 11.1 | 11.1 | 11.1 | 11.1 | 11.1 | 11.1 | 17.6 |
| SDS (weight %) | 1.5 | 1.5 | 1.5 | 1.5 | 1.5 | 0.75 | 3.0 | 5.0 | 1.5 |
| $NH_3$ (mmol/L) | 5.0 | 8.7 | 12.4 | 24.8 | 37.5 | 12.4 | 12.4 | 12.4 | 12.4 |
| Average particle diameter (nm) | 36.5 | 24.3 | 18.4 | 12.5 | 12.0 | 29.6 | 16.5 | 30.0 | 29.8 |
| Transmittance (%) | 70.5 | 90.4 | 95.4 | 96.1 | 96.7 | 85.3 | 95.6 | 84.2 | 84.6 |

Comparative Example 2

Aqueous Dispersion

To 899.5 g of distilled water were added 0.5 g of 1 N ammonia solution and 13.5 g of sodium dodecyl sulfate. To the thus-obtained mixed solution, 100 g of methyltrimethoxysilane was added at 25° C. over 135 minutes, and the mixture was then agitated at the same temperature for 16 hours, giving 1013 g of a transparent aqueous dispersion of fine polymethylsilsesquioxane particles. Table 4 shows the concentrations of each component, and average particle diameters of the fine particles in aqueous dispersion.

Comparative Example 3

Aqueous Dispersion (Solidified into Gel)

To 855.0 g of distilled water were added 45.0 g of 1 N ammonia solution and 13.5 g of sodium dodecyl sulfate. To the thus-obtained mixed solution, 100 g of methyltrimethoxysilane was added at 25° C. over 135 minutes, and the mixture was then agitated at the same temperature for 16 hours. The pH of the resultant mixture was adjusted to 7. Due to the mixture solidifying into a gel, an aqueous dispersion of fine polymethylsilsesquioxane particles could not be obtained. Table 4 shows the concentrations of each component, and average particle diameters of the fine particles.

TABLE 4

| | Aqueous dispersion | |
|---|---|---|
| | Comparative Examples | |
| | 2 | 3 |
| M-TMS (weight %) | 11.1 | 11.1 |
| SDS (weight %) | 1.5 | 1.5 |
| $NH_3$ (mmol/L) | 0.6 | 50.0 |
| Average particle diameter (nm) | 150.0 | Gelated |
| Transmittance (%) | 10.3 | — |

Example 18

Methylethyl Ketone Dispersion

To 300 g of an aqueous dispersion of fine polymethylsilsesquioxane particles obtained in Example 11 was added 1 N aqueous sulfuric acid solution in such a manner that its pH became 7. Subsequently, distillation under reduced pressure was conducted until the water content was reduced to not more than 5% while adding 2000 g of methylethyl ketone dropwise, depositing insoluble components of the dispersion stabilizer. By filtering off the deposited dispersion stabilizer, 75 g of a transparent methylethyl ketone dispersion of fine polymethylsilsesquioxane particles was obtained.

Table 5 shows the average particle diameters of the fine particles in the dispersion, water contents, dispersion stabilizer contents, solids contents, and the presence or absence of coagulation sedimentation. Table 5 also shows the average particle diameters of the fine particles and the presence or absence of coagulation sedimentation after three months storage.

Example 19

Methylethyl Ketone Dispersion

To 450 g of aqueous dispersion of fine polymethylsilsesquioxane particles obtained in Example 11 was added 1 N aqueous sulfuric acid solution in such a manner that its pH became 7. Subsequently, distillation under reduced pressure was conducted until the fine particles transferred from the water in the dispersion to the organic solvent while adding 900 g of methylethyl ketone dropwise. The transfer of the fine particles into the organic solvent was confirmed in the following manner. The solids content was calculated based on the decrease in weight of the dispersion at 110° C. It was then confirmed that the solids content in the water layer decreased and the solids content in the organic layer increased by the amount corresponding to that of fine polymethylsilsesquioxane particles contained in the aqueous dispersion. Deposition of insoluble components of the dispersion stabilizer was not observed. After allowing the thus-obtained dispersion to stand still, the separated water layer was removed. Water was added to the organic layer, which was then agitated to make the dispersion stabilizer in the organic layer transfer into the water layer. The organic layer was separated after being allowed to stand still. Such a liquid separation and washing operation was repeated 3 times to reduce the content of dispersion stabilizer in the organic layer. While adding 270 g of methylethyl ketone to the organic layer dropwise, distillation under reduced pressure was conducted until the water content was reduced to not more than 5%, giving 110 g of a transparent methylethyl ketone dispersion of fine polymethylsilsesquioxane particles.

Table 5 shows the average particle diameters of the fine particles in the dispersion, water contents, dispersion stabilizer contents, solids contents, and the presence or absence of coagulation sedimentation. Table 5 also shows the average particle diameters of the fine particles and the presence or absence of coagulation sedimentation after three months storage.

Example 20

Propyleneglycol Monomethylether Dispersion

To 450 g of aqueous dispersion of fine polymethylsilsesquioxane particles obtained in Example 11 was added 1 N aqueous sulfuric acid solution in such a manner that its pH became 7. Subsequently, distillation under reduced pressure was conducted until the fine particles transferred from the water in the dispersion to the organic solvent while adding 900 g of methylethyl ketone dropwise. Deposition of insoluble components of the dispersion stabilizer was not observed. After allowing the thus-obtained dispersion to stand still, the separated water layer was removed, and water was added to the organic layer. The liquid separation and washing operation as in Example 19 was repeated 3 times to transfer the dispersion stabilizer in the organic layer to the water layer.

While adding propyleneglycol monomethylether to the organic layer dropwise, distillation under reduced pressure was conducted until the temperature of distillate reached the boiling point of propyleneglycol monomethylether, giving 110 g of a transparent propyleneglycol monomethylether dispersion of fine polymethylsilsesquioxane particles.

Table 5 shows the average particle diameters of the fine particles in the dispersions, water contents, dispersion stabilizer contents, solids contents, and the presence or absence of coagulation sedimentation. Table 5 also shows the average particle diameters of the fine particles and the presence or absence of coagulation sedimentation after three months storage.

TABLE 5

| | Organic-solvent dispersion | | |
|---|---|---|---|
| | Examples | | |
| | 18 | 19 | 20 |
| Average particle diameter Immediately after production (nm) | 18.3 | 18.6 | 18.5 |
| Average particle diameter Three months after production (nm) | 18.2 | 18.4 | 18.5 |
| Transmittance (%) | 95.4 | 95.3 | 95.4 |
| Water content (%) | 0.7 | 0.7 | 0.7 |
| Dispersion stabilizer content (ppm) | 50 | 36.5 | 36.2 |
| Solids content (%) | 20.4 | 20.8 | 21.0 |
| Coagulation sedimentation Immediately after production | Not present | Not present | Not present |
| Coagulation sedimentation Three months after production | Not present | Not present | Not present |

Test Example 2

The conditions of the methylethyl ketone dispersion of fine particles obtained in Example 19 were evaluated one week after production. The storage temperature was −5° C., 25° C., or 40° C. respectively. To evaluate preservation stability, the viscosity and molecular weight were measured. The viscosity was measured under the conditions of a solids content of 20.8% and a temperature of 25° C. The number-average molecular weight and weight-average molecular weight were calibrated according to polystyrene standards by gel-permeation chromatography. The molecular weight distribution was calculated based on weight-average molecular weight/number-average molecular weight. The shape of the molecular weight distribution was evaluated by the appearance of the chart obtained using the gel-permeation chromatography.

When the shape of the molecular weight distribution is monomodal and the variance of the viscosity before and after the storage is not more than 5 mPa·s, the dispersion was evaluated as stable. When the shape of the molecular weight distribution is bimodal or more, or the variance of the viscosity before and after the storage exceeds 5 mPa·s, the dispersion was evaluated as unstable.

TABLE 6

| | Before storage | One week after storage | | |
|---|---|---|---|---|
| Storage temperature | — | −5° C. | 25° C. | 40° C. |
| Number average molecular weight | 72,000 | 72,000 | 72,000 | 72,000 |
| Molecular weight distribution | 1.3 | 1.3 | 1.3 | 1.3 |
| Shape of molecular weight distribution | Monomodal | Monomodal | Monomodal | Monomodal |

TABLE 6-continued

| | Before storage | One week after storage | | |
|---|---|---|---|---|
| Viscosity | 3.5 mPas | 3.5 mPas | 3.4 mPas | 3.6 mPas |
| Storage stability | — | Stable | Stable | Stable |

The invention claimed is:

1. A method for producing an aqueous dispersion of fine polysilsesquioxane particles having an average particle diameter of 1 to 40 nm, the method comprising:
    mixing a dispersion stabilizer which is an anion-type surfactant, a base catalyst, and trialkoxysilanes in the presence of an aqueous solvent,
    wherein the aqueous dispersion has a transmittance at 400 nm being not less than 70% when measured using UV/Vis spectra,
    wherein the base catalyst is ammonia,
    wherein the amount of the base catalyst is 4 to 45 mmol/L per total amount of the aqueous solvent, the pH of the aqueous solvent containing the base catalyst being 10 to 12, and
    wherein the anion-type surfactant is sodium dodecyl sulfate.

2. The method for producing an aqueous dispersion of fine polysilsesquioxane particles according to claim 1, wherein the mixing of a dispersion stabilizer, a base catalyst and trialkoxysilanes in the presence of an aqueous solvent is conducted by adding trialkoxysilanes to an aqueous solvent containing a dispersion stabilizer and a base catalyst.

3. The method for producing an aqueous dispersion of fine polysilsesquioxane particles according to claim 1, wherein the average particle diameter is 5 to 25 nm.

4. The method for producing an aqueous dispersion of fine polysilsesquioxane particles according to claim 1, wherein the amount of the trialkoxysilanes used is 1 to 20 weight % of the total weight of the base catalyst and the aqueous solvent.

5. The method for producing an aqueous dispersion of fine polysilsesquioxane particles according to claim 1, wherein the amount of the dispersion stabilizer used is 0.35 to 9 weight % of the total weight of the base catalyst and the aqueous solvent.

6. A method for producing an organic-solvent dispersion of fine polysilsesquioxane particles, the method comprising the steps of:
    providing an aqueous dispersion of fine polysilsesquioxane particles having an average particle diameter of 1 to 40 nm by mixing a dispersion stabilizer which is an anion-type surfactant, a base catalyst, and trialkoxysilanes in the presence of an aqueous solvent;
    adjusting the pH of the aqueous dispersion of fine polysilsesquioxane particles to between 2 and 9;
    adding a water-immiscible organic solvent to the aqueous dispersion of fine polysilsesquioxane particles;
    (a) transferring and dispersing the fine particles in an organic layer while allowing the dispersion stabilizer to remain in a water layer; and
    (b) obtaining the organic layer containing the organic-solvent dispersion,
    wherein the base catalyst is ammonia,
    wherein the amount of the base catalyst is 4 to 45 mmol/L per total amount of the aqueous solvent, the pH of the aqueous solvent containing the base catalyst being 10 to 12,
    wherein the aqueous dispersion has a transmittance at 400 nm being not less than 70% when measured using UV/Vis spectra,
    wherein the anion-type surfactant is sodium dodecyl sulfate, and
    wherein the water-immiscible organic solvent is methylethyl ketone.

7. The method for producing an organic-solvent dispersion of fine polysilsesquioxane particles according to claim 6, wherein step (a) is carried out by conducting distillation after or during addition of a water-immiscible organic solvent to the aqueous dispersion of fine polysilsesquioxane particles to remove water in the aqueous dispersion, thereby transferring and dispersing the fine particles into the organic layer while allowing the dispersion stabilizer to remain in the water layer.

8. The method for producing an organic-solvent dispersion of fine polysilsesquioxane particles according to claim 7, wherein step (b) is carried out by conducting the distillation until the water content of the liquid subjected to the distillation is reduced to not more than 5%; depositing solid components including the dispersion stabilizer; and removing the solid components by filtration.

9. The method for producing an organic-solvent dispersion of fine polysilsesquioxane particles according to claim 7, wherein step (b) is carried out by conducting the distillation until the fine particles are transferred from the water layer in the distilled liquid to the organic solvent; and subjecting the resulting dispersion to liquid separation.

10. The method for producing an organic-solvent dispersion of fine polysilsesquioxane particles according to claim 9, wherein an organic layer is obtained by further subjecting the obtained organic layer to liquid separation and washing with water, if necessary; and conducting distillation during or after addition of a water-miscible organic solvent and/or a water-immiscible organic solvent to the resulting organic layer.

* * * * *